US008120761B2

(12) United States Patent
Kawata et al.

(10) Patent No.: US 8,120,761 B2
(45) Date of Patent: Feb. 21, 2012

(54) METHOD AND APPARATUS FOR POSITION JUDGMENT

(75) Inventors: Tadashi Kawata, Tokyo (JP); Michinori Ichikawa, Tokyo (JP); Fumio Kubo, Tokyo (JP); Yutaka Ishiyama, Tokyo (JP)

(73) Assignee: Stanley Electric Co., Ltd., Tokyo (JP)

( * ) Notice: Subject to any disclaimer, the term of this patent is extended or adjusted under 35 U.S.C. 154(b) by 163 days.

(21) Appl. No.: 11/934,167

(22) Filed: Nov. 2, 2007

(65) Prior Publication Data

US 2008/0186475 A1 Aug. 7, 2008

(30) Foreign Application Priority Data

Nov. 21, 2006 (JP) ................................. 2006-314116

(51) Int. Cl.
  *G01N 21/00* (2006.01)
(52) U.S. Cl. ........... 356/73; 356/614; 356/615; 356/620
(58) Field of Classification Search .................. 356/614, 356/4.01, 73, 615, 5.05, 4.07
  See application file for complete search history.

(56) References Cited

U.S. PATENT DOCUMENTS

| | | | | |
|---|---|---|---|---|
| 6,043,873 A * | 3/2000 | Ramer et al. | ............. | 356/139.03 |
| 6,373,557 B1 * | 4/2002 | Mengel et al. | ............... | 356/4.07 |
| 6,792,203 B1 * | 9/2004 | Ide et al. | .......................... | 396/65 |
| 7,158,280 B2 * | 1/2007 | Sandstrom | .................... | 359/290 |
| 7,236,235 B2 * | 6/2007 | Dimsdale | ..................... | 356/5.01 |
| 7,274,815 B1 * | 9/2007 | Smithpeter et al. | ........... | 382/154 |
| 7,295,292 B1 * | 11/2007 | Jumper et al. | ................ | 356/124 |
| 7,609,249 B2 * | 10/2009 | Fouquet et al. | ............... | 345/156 |
| 2005/0162638 A1 * | 7/2005 | Suzuki et al. | ................ | 356/4.04 |

FOREIGN PATENT DOCUMENTS

| JP | 2000075030 | 3/2000 |
|---|---|---|
| JP | 2005182137 | 7/2005 |

* cited by examiner

*Primary Examiner* — Tarifur Chowdhury
*Assistant Examiner* — Isiaka Akanbi
(74) *Attorney, Agent, or Firm* — Kenealy Vaidya LLP

(57) ABSTRACT

The disclosed subject matter relates to a method and apparatus for position judgment, which can include a plurality of light sources and a photo-detector. The plurality of light sources can be configured to emit a plurality of pulsed lights towards an object from different directions, and a photo-detector can be configured to serially detect the light reflected from the object. A determination of whether the object is moving further away or coming closer to the apparatus can be judged by calculating at least one of a position, an area and a brightness of the object from the reflected light and comparing the data with the previous data for the same value(s). Thus, because the method of the disclosed subject matter does not require a measurement of time as in the conventional methods, the method can result in providing a similar apparatus with a simple configuration and at a low cost, and can be used as a sensor for detecting an obstacle and the like in a vehicle, alarm system, etc.

15 Claims, 18 Drawing Sheets

Fig.4
(a)
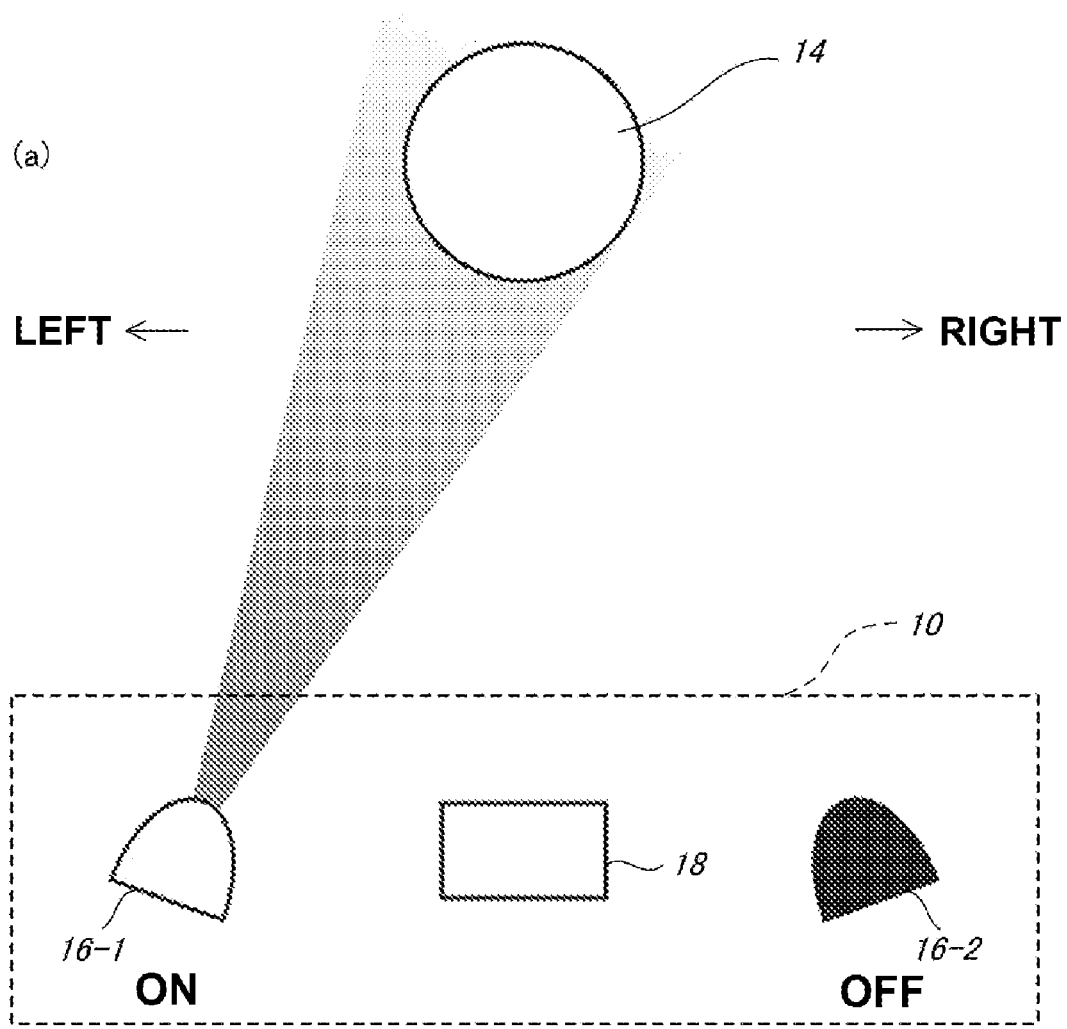
(b)
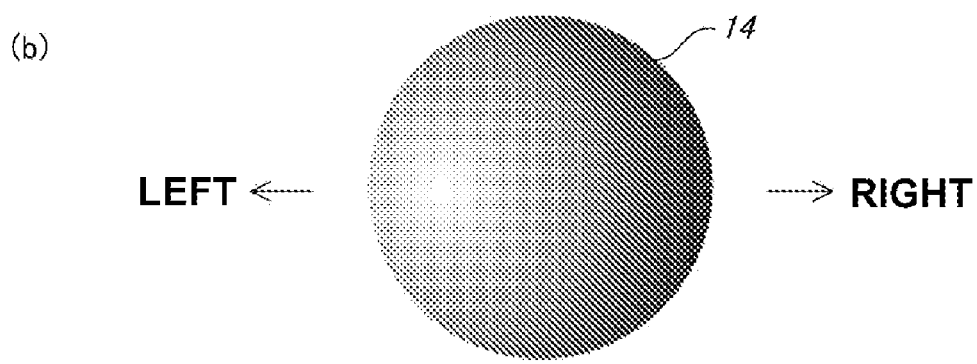

Fig.5
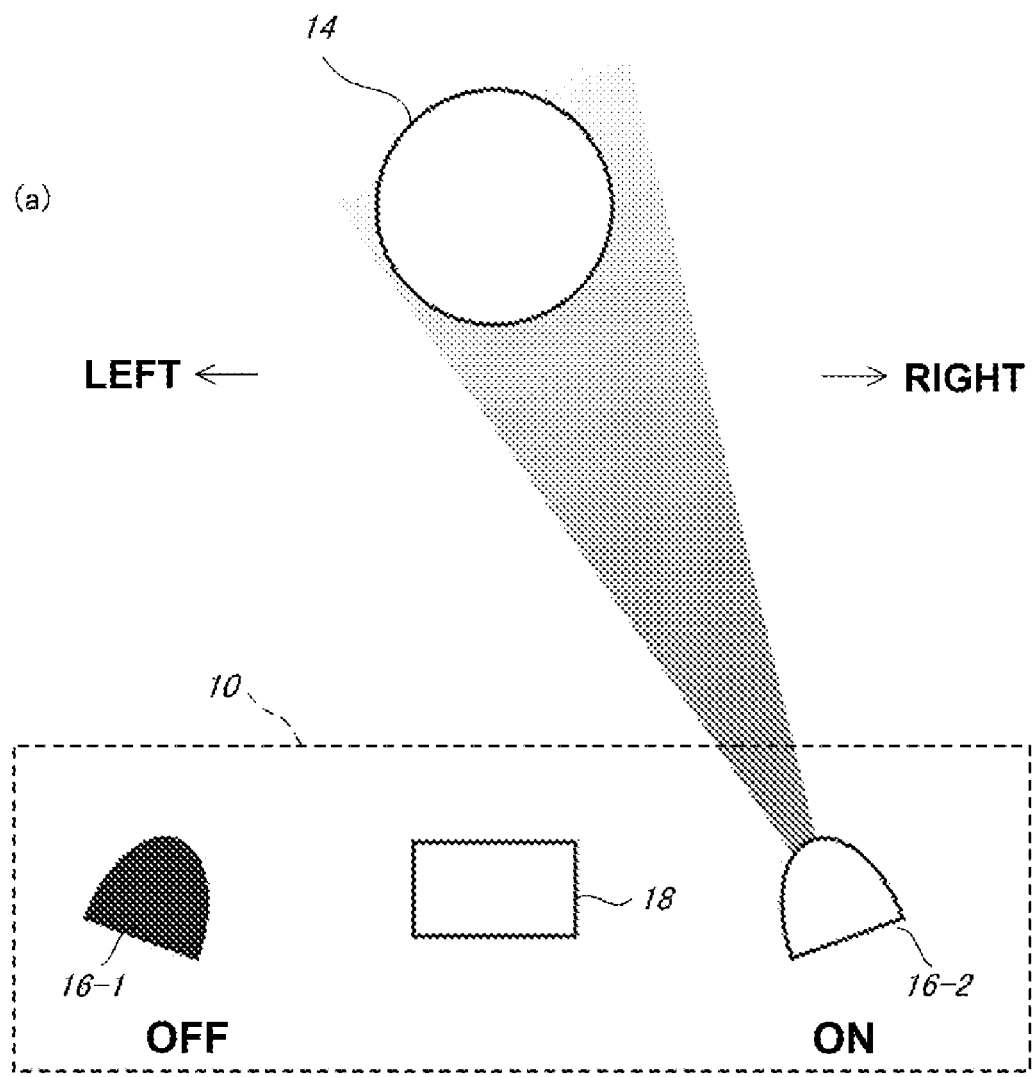
(a)
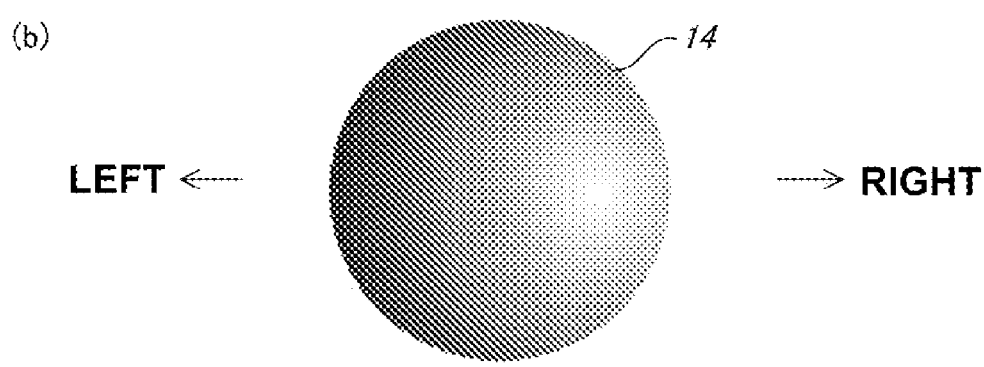
(b)

Fig.7
(a)
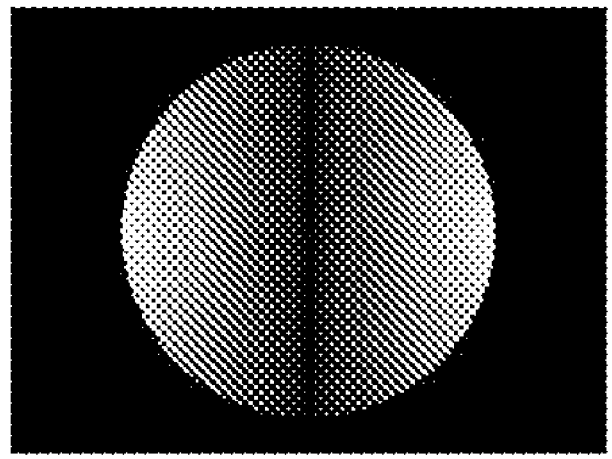
(b)
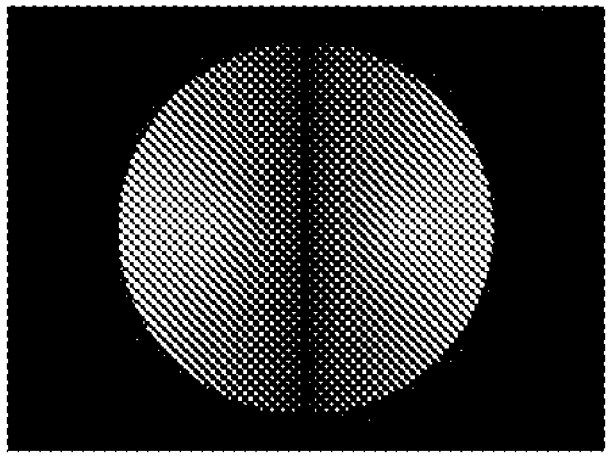
(c)
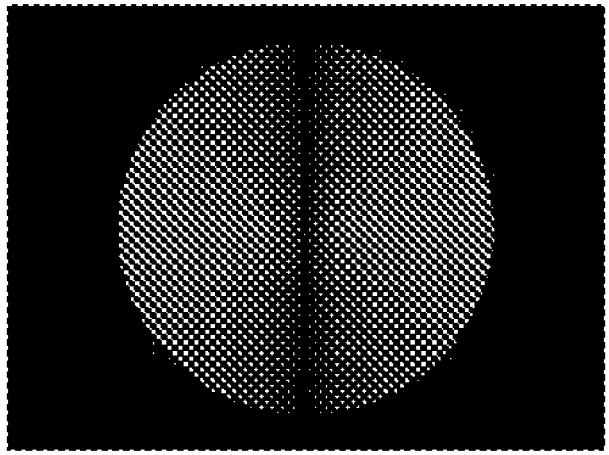

Fig.13
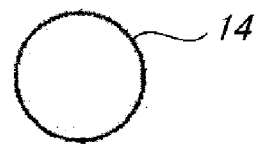
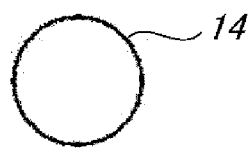
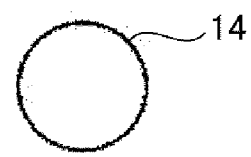
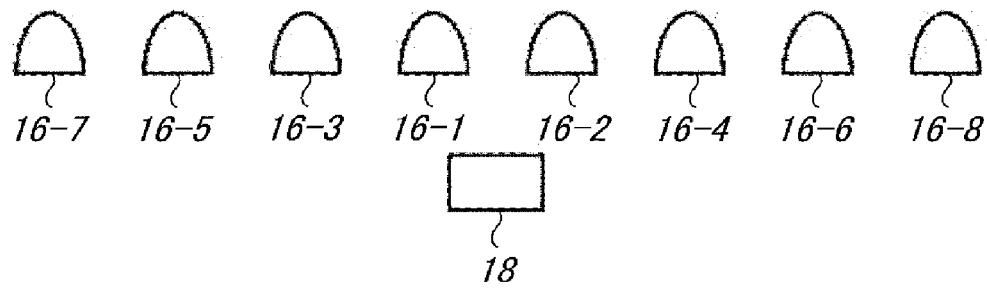

METHOD AND APPARATUS FOR POSITION JUDGMENT

This application claims the priority benefit under 35 U.S.C. §119 of Japanese Patent Application No. 2006-314116 filed on Nov. 21, 2006, which is hereby incorporated in its entirety by reference.

BACKGROUND

1. Field

The presently disclosed subject matter relates to a method for position judgment, and an apparatus for judging distance. The device and method can be used whenever a position (i.e., a location which is determined based on whether an object is located at a far position and/or at a position at a relatively near position) of a moving object can be judged by emitting lights towards it. The disclosed subject matter is particularly suitable for use in a vehicle, a robot, security system and the like.

2. Description of the Related Art

A conventional method for a distance and/or position measurement that can be employed in a vehicle and the like is disclosed, for example, in patent document No. 1 (Japanese Patent Application Laid Open JP2005-182137), patent document No. 2 (Japanese Patent Application Laid Open JP2000-75030), etc. The disclosed conventional method is: emitting lights using EHF (extremely high frequency) radar, a laser radar, etc., towards an object; detecting the reflex light dashed against the object; and calculating the distance and/or position by measuring a time from emitting the light to detecting the reflex light. The above disclosed conventional method is well known as "Time of Flight" (TOF) method.

A distance measurement apparatus using the TOF method can exactly measure a distance from an object thereto. However the measurement accuracy depends on an operating speed of a photo-detector that detects a reflex light. Consequently, when a solid state camera is used as a photo-detector, the solid state camera is required to photograph an object with high speed. However, a solid state camera that allows measuring a distance as described above, such as a high-speed camera that can photograph an object with high speed, is expensive. Thus, a method for distance judgment using the TOF method along with the above described high-speed camera may result in some problems, such as high cost, inaccuracy if the camera is not quick enough, etc.

In addition, when a laser light source is used as a light source in a distance judgment apparatus, a driver is required to create an oscillation thereof. In addition, an output characteristic thereof should also be adjusted in order to prevent people that may be located in a direction of the distance judgment from being affected by the laser light source. Thus, the configuration including the driver and the adjustor may further result in complicating the apparatus.

1. Patent document No. 1: Japanese Patent Application Laid Open JP2005-182137
2. Patent document No. 2: Japanese Patent Application Laid Open JP2000-75030

The presently disclosed subject matter has been devised to consider the above and other problems, features and characteristics. Thus, according to an aspect of the disclosed subject matter, an embodiment of the disclosed subject matter can include a method for position judgment relating to whether an object is located at a location that is further or nearer based on previous object location determinations for the moving object. The method can have a simple configuration and be realized at low cost. Another embodiment of the disclosed subject matter can include a position judgment apparatus using or performing the immediately above described method. The position judgment apparatus can judge whether a moving object is getting nearer or moving further away with a simple configuration and a low cost, and can have practical uses related to a vehicle, a robot, security system, and the like.

SUMMARY OF THE DISCLOSED SUBJECT MATTER

The presently disclosed subject matter has been devised in view of the above described characteristics, problems and the like. An aspect of the disclosed subject matter includes a method for a position judgment relating to whether a moving object is getting further or moving nearer the measuring device, wherein a plurality of pulsed lights are emitted towards a moving object at each different timing and an absolute value of a difference between a brightness of each reflex light reflected from the moving object is calculated in series. A serial comparison between the absolute value and the previous absolute value can result in judging whether the moving object is getting nearer or moving farther away. Thus, the method of the disclosed subject matter does not necessarily require an expensive high-speed camera, because it is not necessary to measure a time, such as in the TOF method.

In the method for a position judgment of the disclosed subject matter, a position and an area of a moving object can be further calculated by forming a composite image data in series that is composed of each reflex light. Thus, the method of the disclosed subject matter can result in judging whether a moving object is getting nearer or moving further away with high accuracy because a moving direction of the object can be detected by evaluating the position and an area thereof. Furthermore, because the plurality of pulsed lights can be emitted by semiconductor light-emitting devices such as LEDs, the method of the disclosed subject matter can provide an apparatus with a simple configuration and a low cost.

Another aspect of the disclosed subject matter includes a position judgment apparatus using the above described method for position judgment. The position judgment apparatus can judge whether a moving object is getting nearer or moving further away with a simple configuration and at low cost. Thus, the position judgment apparatus can be incorporated into various sensors for detecting an object(s), the object(s) including an obstacle, an invader and the like for a vehicle, a robot, a security system, etc.

According to an aspect of the disclosed subject matter, a method for position judgment can include: emitting a first pulsed light that alternates turning on and turning off at a predetermined interval towards an object; emitting a second pulsed light having a different phase from the predetermined interval of the first pulsed light, towards the object from a different direction than the direction that the first pulsed light is emitted; detecting each reflex light reflected from the object in series at each different timing; calculating an absolute value of difference between a brightness of each reflex light at each different timing; and comparing the absolute value with the previous absolute value. The reason why the above described method can judge a relative location of an object is that the absolute value changes in accordance with a location of an object.

According to another of the aspects of the disclosed subject matter, a method for a position judgment can include: emitting a first pulsed light that alternates turning on and turning off at a predetermined interval towards an object; emitting a second pulsed light having a different phase from the predetermined interval or phase of the first pulsed light towards the object from a different direction than the direction of the first pulsed light is emitted; detecting each reflex light reflected from the object in series at each different timing; forming composite image data that is composed of each reflex light at each different timing; calculating at least one of a position, an area, and a brightness of the object in the composite image data; and comparing the at least one of the position, the area and the brightness with the corresponding value of the same at a previous position, area and brightness. Because the immediately above described method can further include detaining and comparing a position and an area of an object, the judgment accuracy can be improved by evaluating two different variables (the position and the area of the object).

In the above described exemplary embodiments of a method for position judgment, each of the first pulsed light and the second pulsed light can alternate turning on and turning off with each other, and can also include a time of turning on simultaneously, respectively. Both the first pulsed light and the second pulsed light can be emitted by at least one LED, respectively. In addition, each reflex light of both the first pulsed light and the second pulsed light can be detected when the corresponding light of both pulsed lights is emitted, respectively. The reason will be described later in detail.

According to another aspect of the disclosed subject matter, a position judgment apparatus using a method for a position judgment can include: a waveform generator that is configured to form at least both the first pulsed light and the second pulsed light; a driving control that is configured to drive at least both the first pulsed light and the second pulsed light; a photo-detector that is configured to detect each reflex light of at least both the first pulsed light and the second pulsed light at each different timing; an image data former that is configured to form brightness data from each reflex light; an operating processor that is configured to calculate an absolute value of a difference between the brightness of each reflex light at each different timing; and a judging processor that is configured to judge whether an object is moving closer or moving further away at each different timing in accordance with the absolute value data. The position judgment apparatus can realize the method for a position judgment as described above in paragraph [0010]. It should be noted that the actual distance in units of length need not be determined. Rather, only the relative positioning of the object is determined by determining whether certain data received from the object indicate that it is closer or further away over time, to thus make the distance/position judgment.

According to an other exemplary embodiment of another aspect of the disclosed subject matter, a position judgment apparatus using a method for position judgment can include: a waveform generator that is configured to form at least both the first pulsed light and the second pulsed light; a driving control that is configured to drive at least both the first pulsed light and the second pulsed light; a photo-detector that is configured to detect each reflex light of at least both the first pulsed light and the second pulsed light at each different timing; an image data former that is configured to form image data from each reflex light; composite image data former that is configured to form composite image data at each timing from the image data; an operating processor that is configured to calculate at least one of a position, an area and a brightness of the object in the composite image data at each different timing; and a judging processor that is configured to judge whether the object is moving further or approaching the judgment apparatus at each different timing in accordance with at least one of the position, the area and the brightness. The position judgment apparatus can realize the method for a position judgment as described above in paragraph [0011].

BRIEF DESCRIPTION OF THE DRAWINGS

The above and other characteristics and features of the disclosed subject matter will become clear from the following description with reference to the accompanying drawings, wherein:

FIG. 4(a) is an explicative diagram showing a state in which one light source emits light from the position judgment apparatus of FIG. 1, and FIG. 4(b) is an explicative diagram showing image data of the object in the state shown by FIG. 4(a);

FIG. 5(a) is an explicative diagram showing a state in which an other light source emits a light from the position judgment apparatus of FIG. 1, and FIG. 5(b) is an explicative diagram showing image data of the object in the state shown by FIG. 5(a);

FIG. 7 is an explicative diagram explaining an operation of the position judgment apparatus of FIG. 1;

FIG. 13 is an explicative diagram showing a second exemplary modification of a position judgment apparatus made in accordance with principles of the disclosed subject matter;

DETAILED DESCRIPTION OF EXEMPLARY EMBODIMENTS

Exemplary embodiments of the disclosed subject matter will now be described in detail with reference to FIGS. 1-18.

Figure 1:
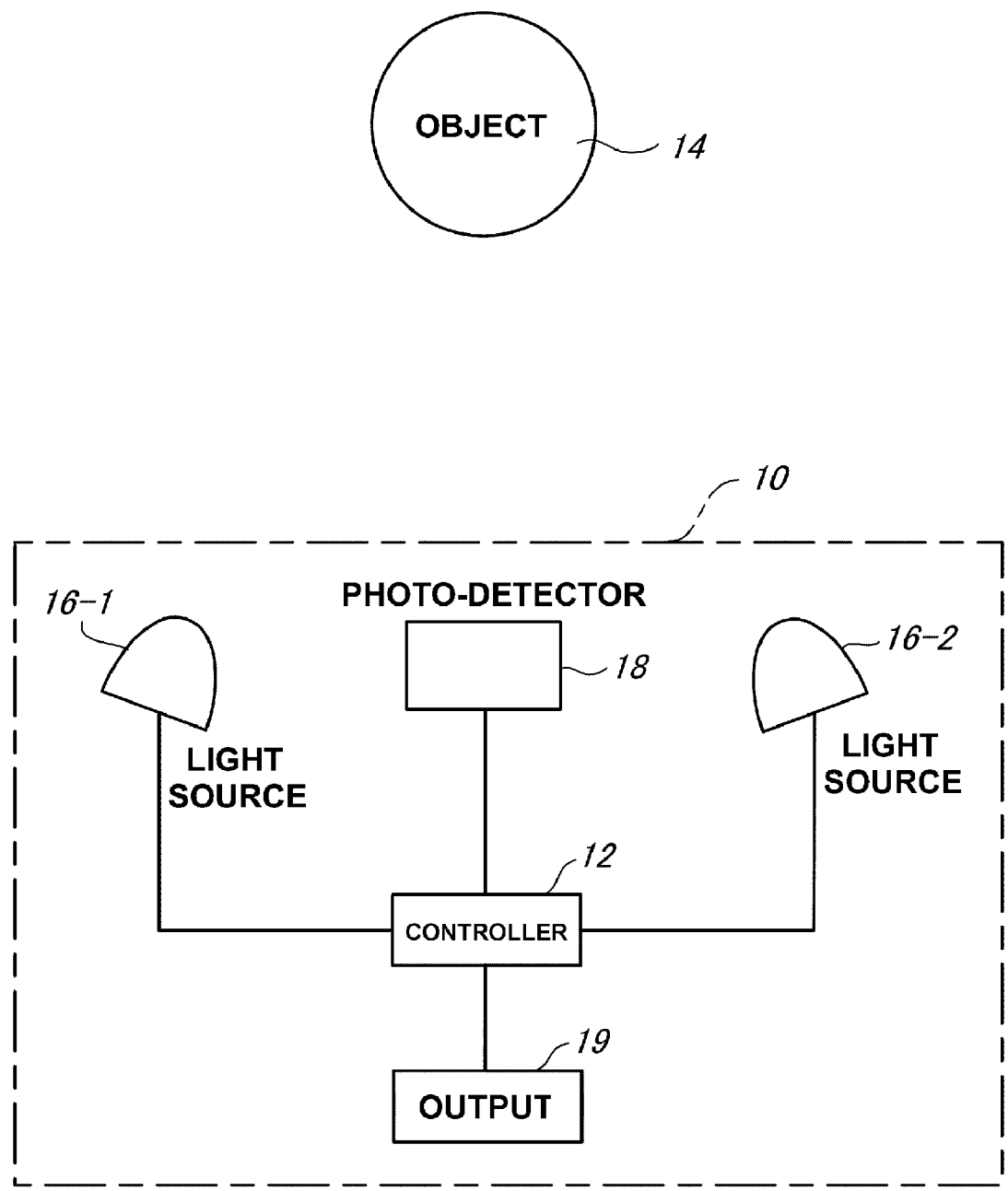
FIG. 1 is an explicative block diagram of a position judgment apparatus in accordance with a first exemplary embodiment of the disclosed subject matter.

FIG. 1 is an explicative block diagram of a position judgment apparatus in accordance with a first exemplary embodiment of the disclosed subject matter.

A position judgment apparatus 10 in accordance with a first exemplary embodiment of the disclosed subject matter provides a controller 12 including a micro computer. The controller 12 can control the entire operation of the position judgment apparatus 10.

The position judgment apparatus 10 can also include: two light sources 16-1, 16-2 that emit respective light towards an object 14 by the controller 12; a photo-detector 18 configured to receive two reflex lights, which are reflected from the object 14 and which originated from the two light sources 16-1, 16-2; and an output 19 that is configured to input a judgment result outputted from the controller 12 and to inform the judgment result.

The light sources 16-1, 16-2 can be light-emitting means and can be composed of various light sources, for example, a bulb, a semiconductor light source such as LED, etc. The photo-detector 18 can be light-detecting means and can be composed of semiconductor photo-chips such as CCD, CMOS and the like, or a photo-sensor including a plurality of photo-diodes. The output 19 can be outputting means and can be an information display such as a CRT, LCD and the like, or a sound device for a warning such as a speaker and the like. In addition, the output 19 can also output the judgment result to other devices such as a controller in a vehicle, a robot, security system, and etc.

The light sources 16-1, 16-2 can be respectively located in different positions in order to emit light thereof from different direction towards an object 14. The object 14 in exemplary embodiments described later is spherical so as to ease an understanding of the disclosed subject matter, however the shape of an object is not limited to the spherical shape.

The photo-detector 18 can be located in a position to detect the two reflex lights, which are dashed against an object 14 from the two light sources 16-1, 16-2. Thus, the photo-detector 18 can be located, for example, on a middle position between the light sources 16-1 and 16-2.

Figure 2:
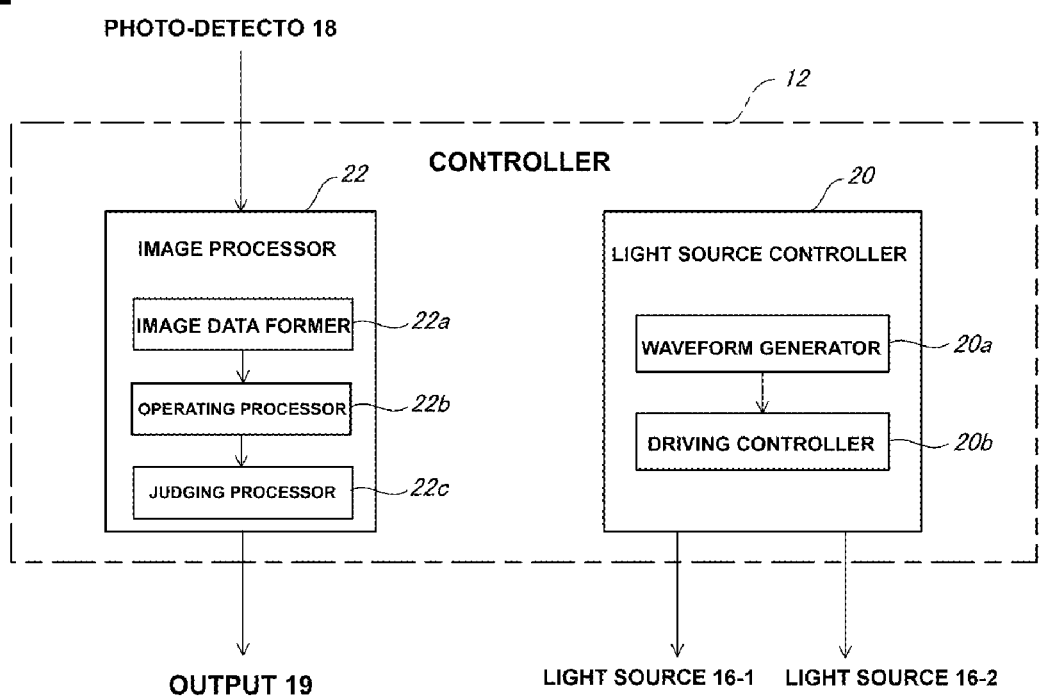
FIG. 2 is an explicative block diagram of a controller in the position judgment apparatus of FIG. 1.
Figure 3:
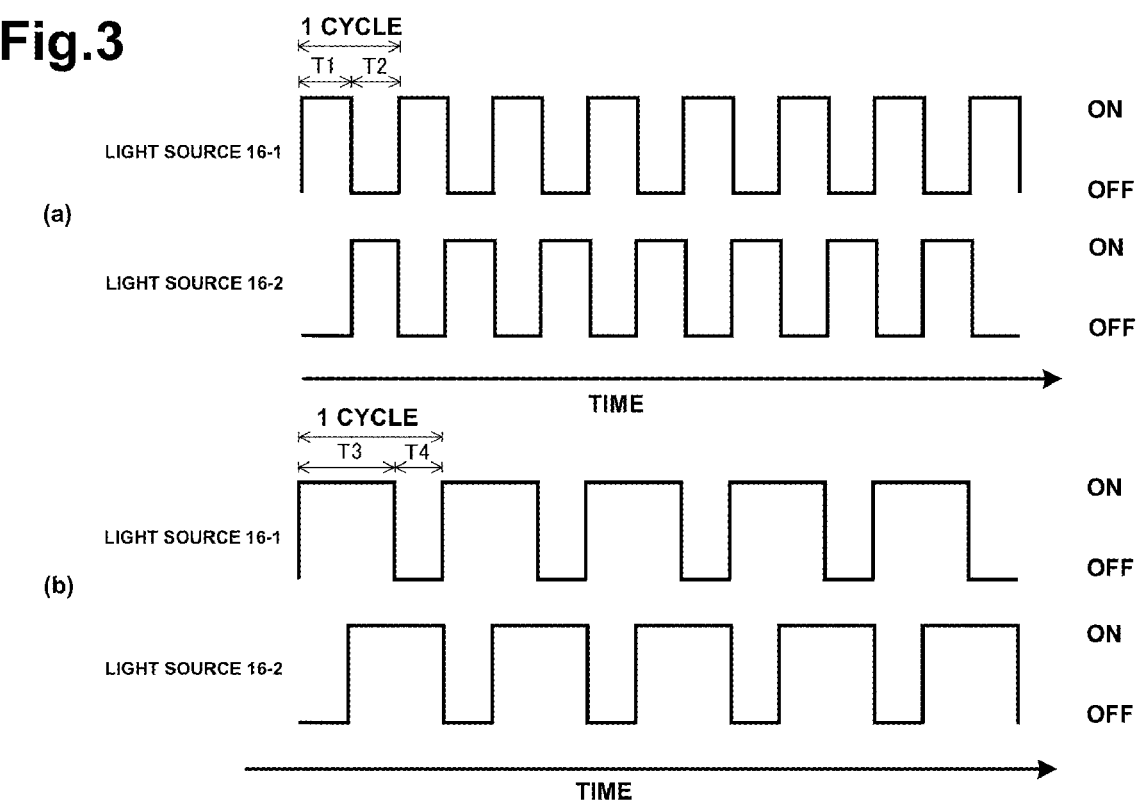
FIG. 3 is a timing chart showing exemplary waveforms of light sources for the position judgment apparatus of FIG. 1.

The controller 12 will now be described with reference to FIG. 2. The controller 12 can include a light source controller 20 and an image processor 22. The light source controller 20 can include: a waveform generator 20a configured to generate light-emitting waveforms from the light sources 16-1, 16-2 at respectively different timing; and a driving controller 20b that controls the light sources 16-1, 16-2, to emit light towards an object 14 in accordance with the light-emitting waveforms.

More specifically, the waveform generator 20a can generate various light-emitting waveforms via the light sources 16-1, 16-2. For example, light-emitting waveforms of the light sources 16-1, 16-2 shown by FIG. 3(a), (b) include the same on-times T1, T3 and the same off-times T2, T4, respectively. However, each light-emitting waveform of the light sources 16-1, 16-2 can be respectively different with respect to their timing of on-time and off-time, that is, their two waveforms can be the same and their two phases can be different. The driving controller 20b can control the light sources 16-1, 16-2 so as to alternate turning on and turning off in accordance with the light-emitting waveforms generated in the waveform generator 20a.

In the above described light source controller 20, the waveform generator 20a can selectively generate both the light-emitting waveforms shown by FIG. 3(a) and the light-emitting waveforms shown by FIG. 3(b). The driving controller 20b can control both the light sources 16-1 and 16-2 so as to emit respective light towards an object 14 in accordance with the above described light-emitting waveforms. The light-emitting waveforms shown by FIG. 3(a) refer to "the first light-emitting waveform", the light-emitting waveforms shown by FIG. 3(b) refer to "the second light-emitting waveform" and they will be described later in detail.

The first light-emitting waveform can include two waveforms for lighting the light sources 16-1, 16-2, in which on-times T1 are as long as off-times T2. However, while the light source 16-1 lights (on-time T1), the light source 16-2 always turns off (off-time T2), and while the light source 16-2 lights (on-time T1), the light source 16-1 always turns off (off-time T2) in this particular embodiment. Thus, the light sources 16-1, 16-2 do not light at the same time and respectively alternate turning on and turning off as 1 cycle, of which period is both on-time T1 and off-time T2.

The second light-emitting waveform can also include two waveforms for lighting the light sources 16-1, 16-2, in which on-times T3 and off-times T4 are the same, respectively. However, the on-time T3 can have twice the period of the off-time T4 and after one of light sources 16-1, 16-2 turns on (on-time T3), the other can turn on (on-time T3) after half of the on-time T3. Thus, the light sources 16-1, 16-2 can light at the same time during half of the on-time T3 and can respectively alternate turning on and turning off as 1 cycle, of which period is both on-time T3 and off-time T4. In both the first light-emitting waveform and the second light-emitting waveform, the light source 16-1 can turn on at first.

The image processor 22 can include: an image data former 22a, which is configured to input reflex data outputted from the photo-detector 18 and to form image data of an object from the reflex data (hereinafter referred to as "the image data"); an operating processor 22b, which is configured to calculate a brightness of the image data outputted from the image data former 22a; and a judging processor 22c, which is configured to judge a position of an object 14 in accordance with the brightness data.

The above described position of an object 14 outputted from the judging processor 22c, that is, signals showing a location of an object 14 can be outputted to the output 19, which can proceed in accordance with the signals. The operation of the position judgment apparatus 10 of the configuration described above will be given later with reference to FIGS. 4-8.

In the position judgment apparatus 10 as show in FIGS. 4(a) and 5(a), the light source 16-1 can be located on a left side of an object 14 and the light source 16-2 can be located on a right side of an object 14. The photo-detector 18 can be located in the middle position between the light sources 16-1, 16-2. When the waveform generator 20a generates the first light-emitting waveform shown by FIG. 3(a), the operation is as follows.

The light source 16-1 can turn on at first and emit light toward an object 14 as shown in FIG. 4(a). During that time, the light source 16-2 can always turn off and the photo-detector 18 can receive only the reflex light originating from the light source 16-1. The reflex data outputted from the photo-detector 18 in accordance with the reflex light can be transmitted to the image data former 22a, which can form the image data of an object 14 from the reflex data.

FIG. 4(b) shows the image data, of which the left side can be brighter than a right side thereof because the light source 16-1 located on a left side emits light towards an object 14 and the light source 16-2 located on a right side is off When the light source 16-2 next turns on and the light source 16-1 turns off as shown in FIG. 5(a), the photo-detector 18 can receive only reflex light from the light source 16-2.

In this case, the reflex data outputted from the photo-detector 18 in accordance with the reflex light can also be transmitted to the image data former 22a, which can form image data of object 14 from the reflex data. FIG. 5(b) shows the image data, of which the right side can be brighter than the left side thereof because the light source 16-2 located on a right side emits the light towards an object 14 and the light source 16-1 located on a left side is off.

Figure 6:
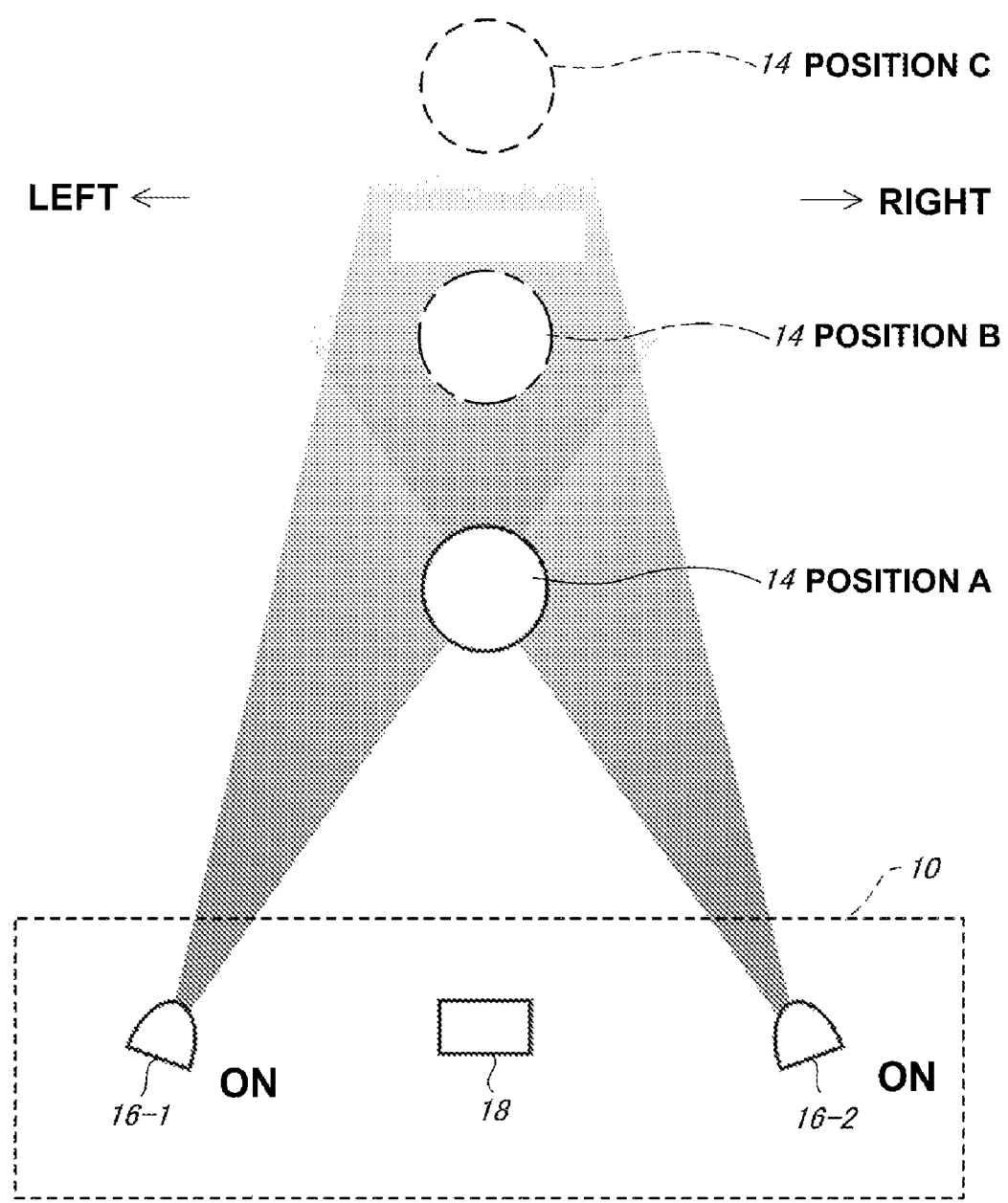
FIG. 6 is an explicative diagram showing a state in which two light sources emit light towards objects located at different positions.

The position judgment apparatus 10 can alternate the cyclical process of the above described first light-emitting waveform in series. In the image data formed in the image data former 22a as shown by FIG. 6, the nearer the object 14 comes to the position judgment 10, the larger the light amount dashed or reflected against a surface of the object 14 becomes as shown by position A in FIG. 6. The farther the object 14 travels from the position judgment 10, the smaller the light amount dashed against the surface of the object 14 becomes as shown by position C in FIG. 6.

FIG. 6 shows each of the light sources 16-1, 16-2 as having one light-emitting device in order to ease an understanding of the disclosed subject matter using a simple drawing. The light-emitting device is not limited to one device, and a plurality of light-emitting devices can be used as light source 16-1, 16-2.

After the image data former 22a forms the image data of an object 14 as described above, the operating processor 22b can calculate a brightness of the image data. More specifically, the operating processor 22b can calculate a brightness of each pixel in the image data. In one cycle of the first light waveform, the operating processor 22b can also calculate an absolute value of a difference between a brightness of each pixel in the image data in the case that the light source 16-1 is on and the light source 16-2 is off, and can also calculate it in the case that the light source 16-1 is off and the light source 16-2 is on.

The judging processor 22c can judge a location of an object 14 in accordance with the absolute values in each cycle calculated by the operating processor 22b and can output the judgment result to the output 19. That is, when the brightness of each pixel in the image data in the case that the light source 16-1 is on and the light source 16-2 is off refers to "f1" and the brightness of each pixel in the image data in the case that the light source 16-2 is on and the light source 16-1 is off in the same cycle refers to "f2". The absolute value of the differential brightness of each pixel in the image data in the same cycle can be calculated by the operating processor 22b using the following formula.

$$|f1(x,y) - f2(x,y)| \quad \text{(formula 1)}$$

Figure 18:
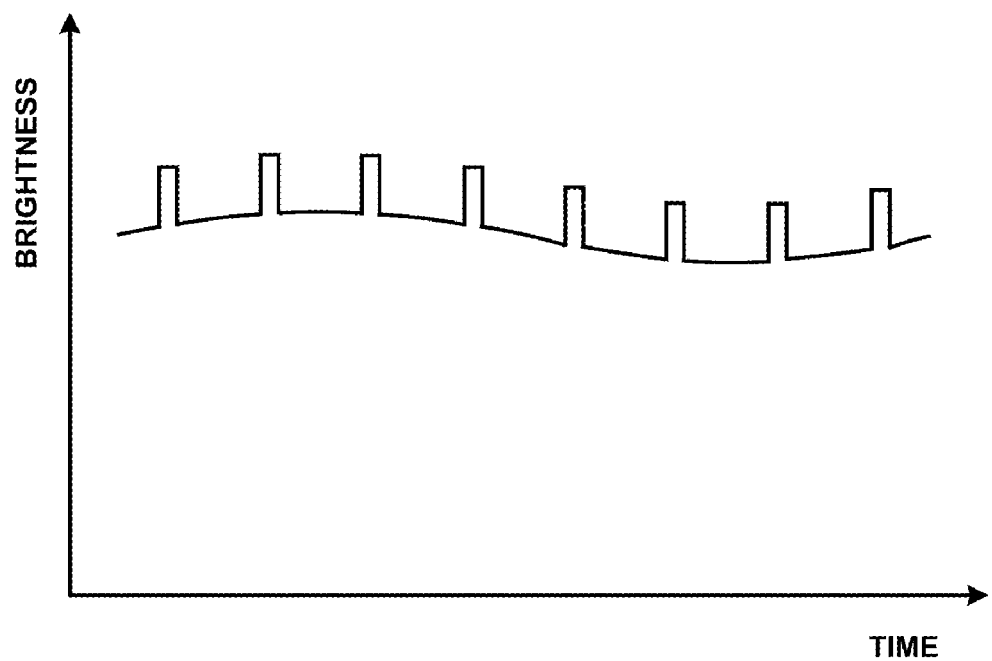
FIG. 18 is an explicative diagram showing a brightness data when detecting reflex lights in series by a photo-detector.

FIG. 18 is an explicative diagram showing brightness data when detecting the reflex lights in series by the photo-detector 18. The brightness data add the brightness value(s) for the reflex lights from an object 14 emitted by the light sources 16-1, 16-2 to brightness value(s) for background. Thus, the difference between f1 and f2 can result in the brightness of the reflex lights because a background's brightness can be eliminated.

The image data shown in FIG. 7(a) corresponds to the object 14 at position A that is the nearest to the position judgment apparatus 10 as compared to the three objects shown in FIG. 6. FIG. 7(c) shows the image data of the object 14 at position C that is the farthest to the position judgment apparatus 10 as compared to the three objects shown in FIG. 6, and FIG. 7(b) shows the image data at position B between position A and position C. Each image data that are shown in FIGS. 7 (a), (b), (c) shows brighter object 14 in turn.

As shown by the three image data of FIG. 7, the nearer an object 14 comes to the position judgment apparatus 10, the bigger the difference becomes between each brightness of a left outside and a right outside portion of the image data of an object 14. The farther an object 14 is away from the position judgment apparatus 10, the smaller the difference between each brightness of a left outside and a right outside portion of the image data of an object 14. The reason is that brightness decreases in inverse proportion to a square of the distance from the light sources 16-1, 16-2 to an object 14.

Thus, the absolute value of the differential brightness of each pixel in the respective cycle can result in judging the position and judging whether an object 14 is traveling away from the position judgment apparatus 10, or traveling towards it. The judging processor 22c can carry out the judgment process described above and can output the judgment result to the output 19. The output 19 can carry out the processes according to the judgment result, for example, a warning display for an approach of an object on an information display, a warning sound via a warning device and transmitting the judgment result to other control devices, etc.

In the judging processor 22c, a method for the position judgment between the position judgment apparatus 10 and an object 14, for example, can: determine a predetermined threshold; judge that an object is approaching the position judgment apparatus 10 when the absolute value(s) proceed the threshold; and judge that an object is traveling away from the position judgment apparatus 10 when the absolute values are within the range of the threshold.

Another method, for example, can serially compare a plurality of image data as shown in FIG. 7 and can carry out the position judgment regarding whether an object 14 is approaching the position judgment apparatus 10, or is traveling away from it in accordance with the comparing result. Thus, even if both the position judgment apparatus 10 and an object 14 move in a vehicle or the like, the position judgment apparatus 10 can judge a distance or travel relationship to or from an object 14 thereto.

The second light-emitting waveform will now be described. The position judgment apparatus 10 can also judge a location of an object 14 (whether the object is approaching or retreating) using the second light-emitting waveform. Because the light sources 16-1, 16-2 can light at the same time during a half period of on-time T3, the position judgment can form better image data of an object 14 by photographing it during simultaneous lighting.

A second embodiment of the disclosed subject matter will now be described in detail with reference to FIGS. 8-11. In the following description, the same or corresponding elements as shown and described with reference to FIG. 1-7 use the same marks as marks used in the above descriptions, and t their operation and description are abridged in the following description.

Figure 8:
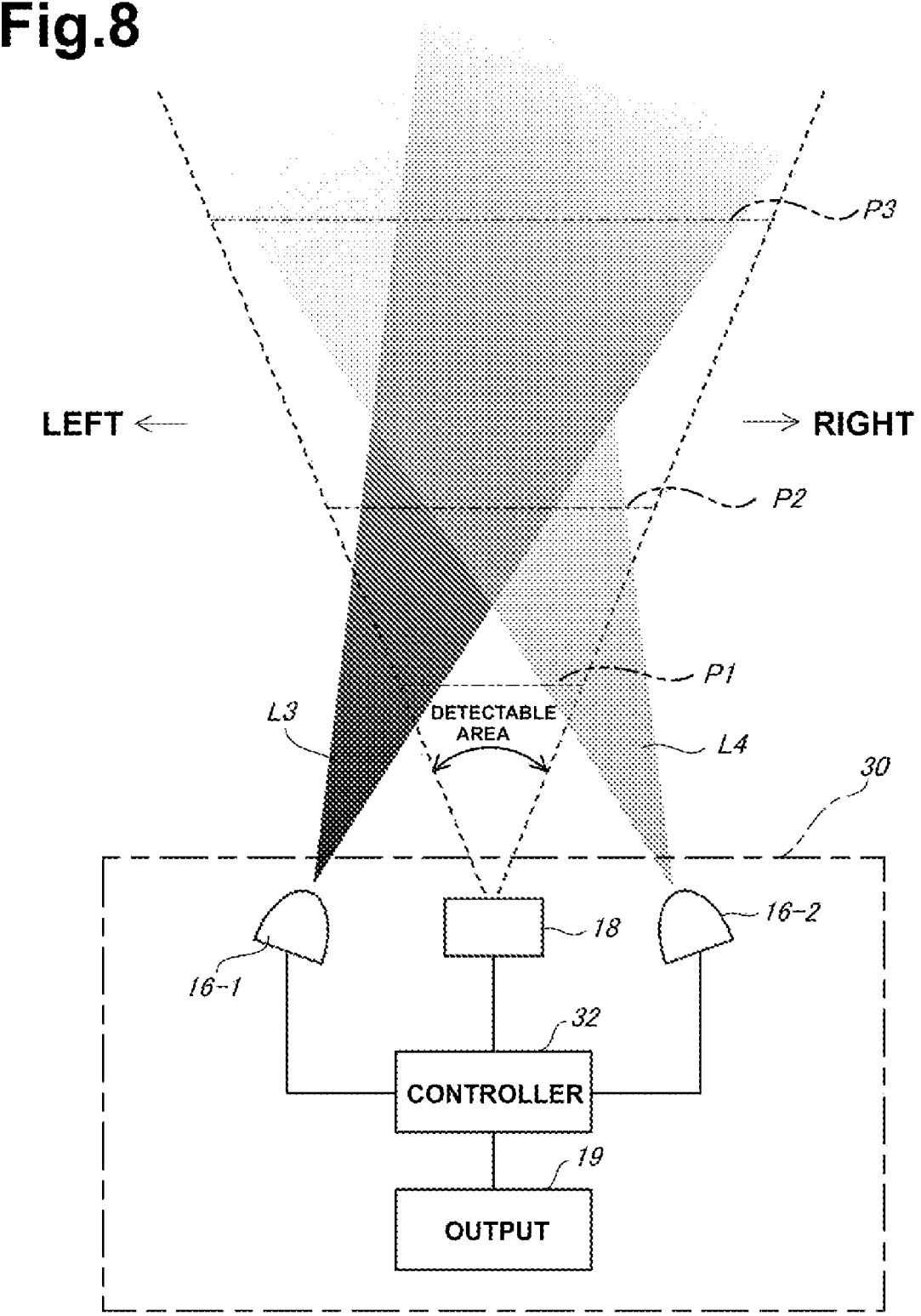
FIG. 8 is an explicative block diagram of a position judgment apparatus in accordance with a second exemplary embodiment of the disclosed subject matter.

A position judgment apparatus 30 shown in FIG. 8 can include a controller 32 which can judge a location of an object 14 (whether the object is approaching or retreating) in accordance with an area, a position and a brightness of a composite image data of the object 14. The composite image data can be formed by composing each set of image data related to the object formed in each cycle of the light-emitting waveform.

Figure 9:
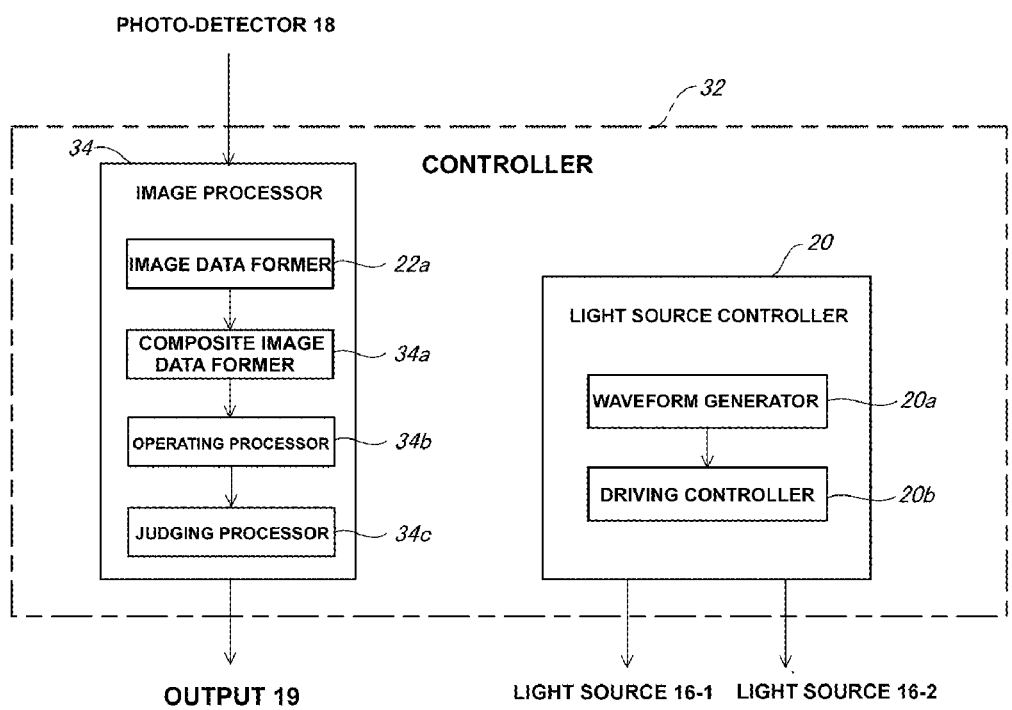
FIG. 9 is an explicative block diagram of a controller for the position judgment apparatus of FIG. 8.

In the controller 32 of the position judgment apparatus 30 as shown in FIG. 9, an image processor 34 can include: an image data former 22a, which is configured to input reflex data outputted from the photo-detector 18 and to form image data in each cycle; a composite image data former 34a that is configured to input the image data and to compose the image data in each cycle; an operating processor 34b that is configured to input the composite image data and to calculate an area, a position and a brightness of an object 14 in the composite image data; and a judging processor 34c, which is configured to evaluate the area, the position and the brightness of the object 14 and to carry out a judging process. The judging processor 34c can output a judgment result to the output 19, which can carry out the process(es) according to the judgment result, for example, providing a warning display regarding an approach of an object on an information display, a warning sound via a warning device, and/or transmitting the judgment result to other control devices.

In the position judgment apparatus 30 described above, the light sources 16-1, 16-2 can emit lights L3, L4 towards an object 14 in accordance with the light-emitting waveform. The lights L3, L4 can dash against the object 14 and can be reflected as "reflex light", and reflex light can be detected by a photo-detector 18. The reflex data detected by the photo-detector 18 can be inputted in the image former 22a, which can form the image data of the object 14. A composite image data will be described with reference to FIGS. 10 and 11, wherein both the image data and the composite image data are conceptual objects for explanation purposes and are not actual image data and composite image data of a spherical object 14.

Figure 10:
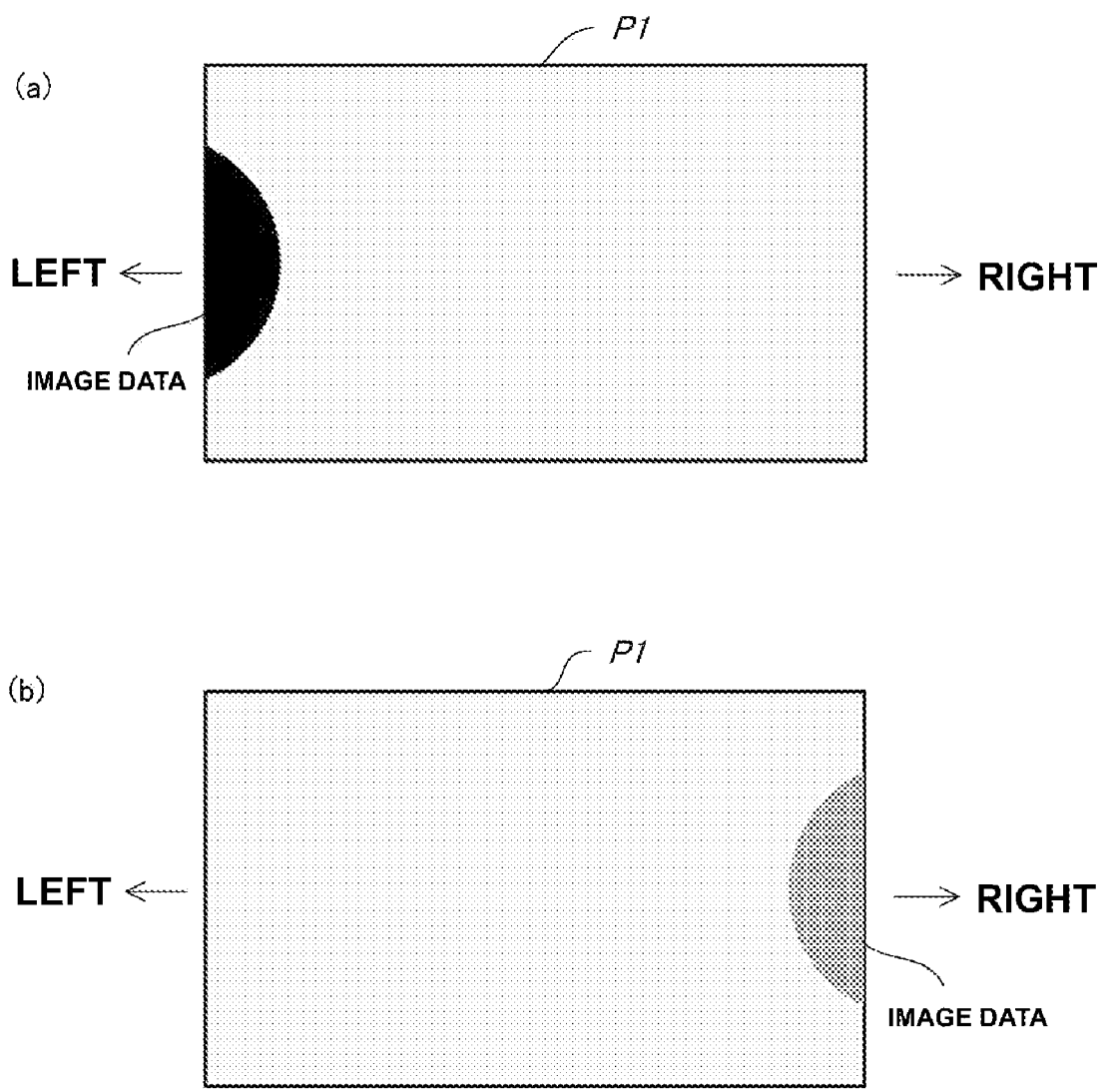
FIG. 10 is an explicative diagram explaining an operation of the position judgment apparatus of FIG. 8.

When an object 14 is near the position judgment apparatus 30, for example, on a photographing surface P1, and the light L3 of the light source 16-1 is only emitted without the light L4 of the light source 16-2, the image data formed by the image data former 22a can show a waned image of the object 14 on a left side of the photographing surface P1 due to a restriction of a photographing area as shown FIG. 10(*a*). When an object 14 is on a photographing surface P1 and the light L4 of the light source 16-2 is only emitted without the light L3 of the light source 16-1, the image data can show a waned image of the object 14 on a right side of the photographing surface P1 due to a restriction of a photographing area as shown FIG. 10(*b*)

FIG. 8 shows a state of the lights L3, L4 emitted from the light sources 16-1, 16-2 towards an object 14 in a simple drawing for ease of understanding of the disclosed subject matter. The above described image data shown FIG. 10 (*a*-*b*), that is, the image data formed in the case that the object 14 is on the photographing surface P1 can be composed in the composite image data former 22d, which can form the composite image data shown in FIG. 11(*a*). Similarly, when an object 14 is on a photographing surface P2 that is positioned farther than the photographing surface P1 from the position judgment apparatus 30, the composite image former 22d can form the image data shown in FIG. 11(*b*). When an object 14 is on a photographing surface P3 that is positioned farther than the photographing surface P2 from the position judgment apparatus 30, the composite image former 22d can form the image data shown in FIG. 11(*c*).

Figure 11:
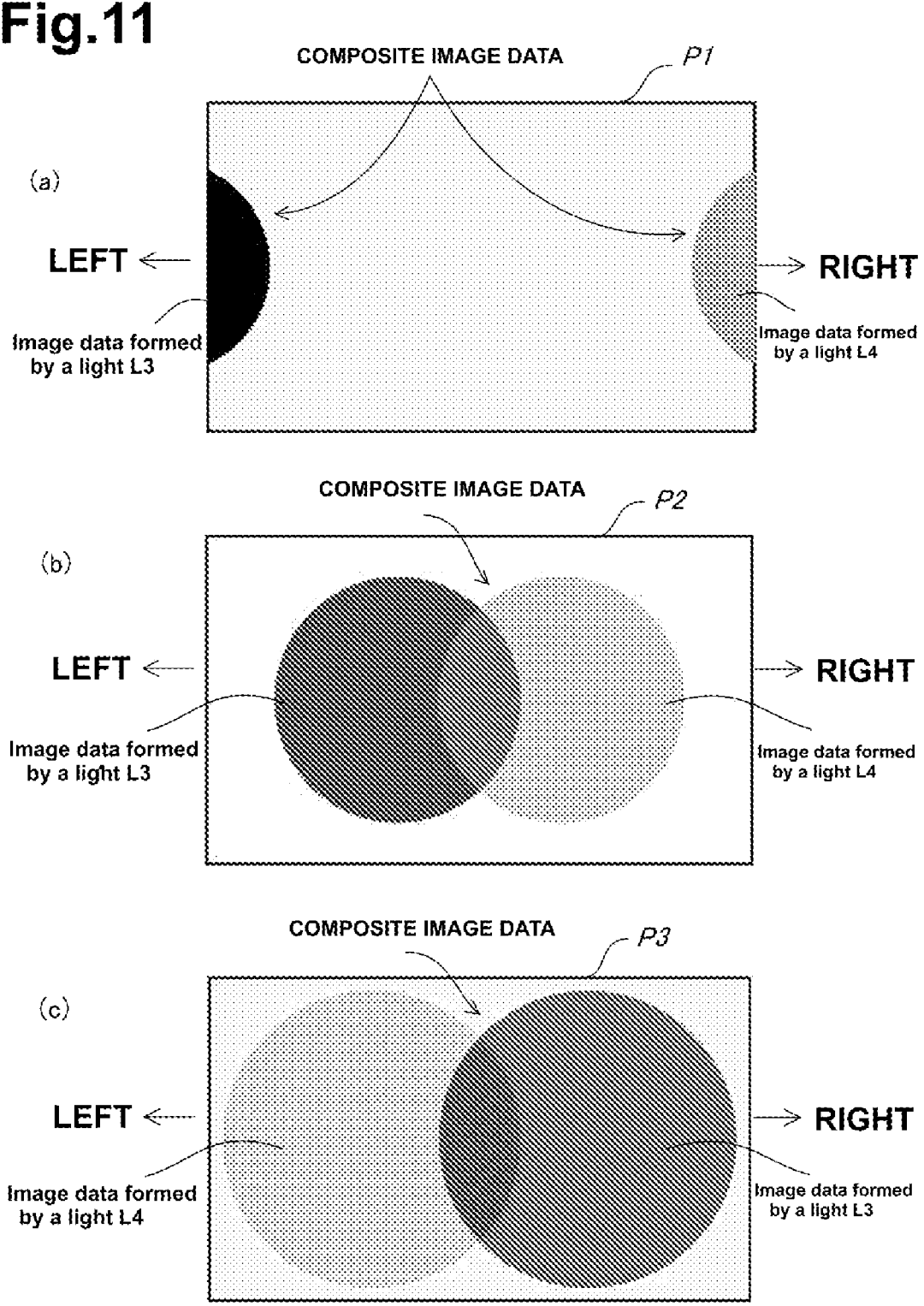
FIG. 11 is another explicative diagram explaining an operation of the position judgment apparatus of FIG. 8.

An operating processor 34b can calculate an area, a position and a brightness of the object 14 in the above described composite image data. When comparing the three composite image data shown in FIG. 11, the composite image data of the object 14 on the photographing surface P1 can be divided on both sides of left and right areas, and the area thereof can be small and a differential brightness thereof can be clear and large as shown in FIG. 11(*a*). The reason is that the position of the object 14 (P1) is the nearest from the position judgment apparatus 10 in the three positions P1, P2, P3.

When the object 14 is on the photographing surface P3 positioned the farthest from the position judgments apparatus 30, the image data emitted by the light L3 can be located more towards the right side than the image data emitted by the light L4 on the photographing surface P3. The image data emitted by the light L4 can be located towards the left side as compared to the image data emitted by the light L3 on the photographing surface P3. Thus, each of the image data emitted by the lights L3, L4 can be reversed on either side on the photographing surfaces P1, P3. The composite image data of the object 14 on the photographing surface P3 can be located on the middle wide area of the photographing surface P3, and the area thereof can be large and a differential brightness thereof can be small with a low brightness as shown in FIG. 11(*c*). The reason is that the position of the object 14 (P3) is the farthest from the position judgment apparatus 30 in the three positions P1, P2, P3.

When the object 14 shown in FIG. 11(*b*) is located on the photographing surface P2 between the photographing surfaces P1, P3, the image data emitted by the light L3 can be located more towards the left side than the image data emitted by the light L4 on the photographing surface P2 and the image data emitted by the light L4 can be located more towards the right side than the image data emitted by the light L3 on the photographing surface P2. A positional relation of the image data obtained by emission of lights L3, L4 on the photographing surface P2 can be the same as that on the photographing surface P1. The composite image data from the object 14 on the photographing surface P2 can be located on the middle area of the photographing surface P2, and the area thereof can be smaller than shown in FIG. 11(*c*) and a differential brightness thereof can be smaller than shown in FIG. 11(*a*).

Thus, by evaluating an area, a position and a brightness of the object 14 in the composite image data, the position judgment apparatus 30 can judge whether the object 14 is located far away from it, or near it. The judging processor 34c can carry out the above described judgment process and can output the judgment result to the output 19. The output 19 can carry out processes according to the judgment result, for example, providing a warning display for an approach of an object on an information display, a warning sound via a warning device, and/0r transmitting the judgment result to other control devices, etc.

In the judging processor 34c, a method for the position judgment between the position judgment apparatus 30 and an object 14 by evaluating an area, a position and a brightness of the object 14 in each composite image data of the above described cycles, for example, can include: determining a predetermined threshold; judging that an object 14 is approaching the position judgment apparatus 30 when the absolute values go beyond the threshold; and judging that an object 14 is traveling away from the position judgment apparatus 30 when the absolute values are within the range of the threshold.

Figure 12:
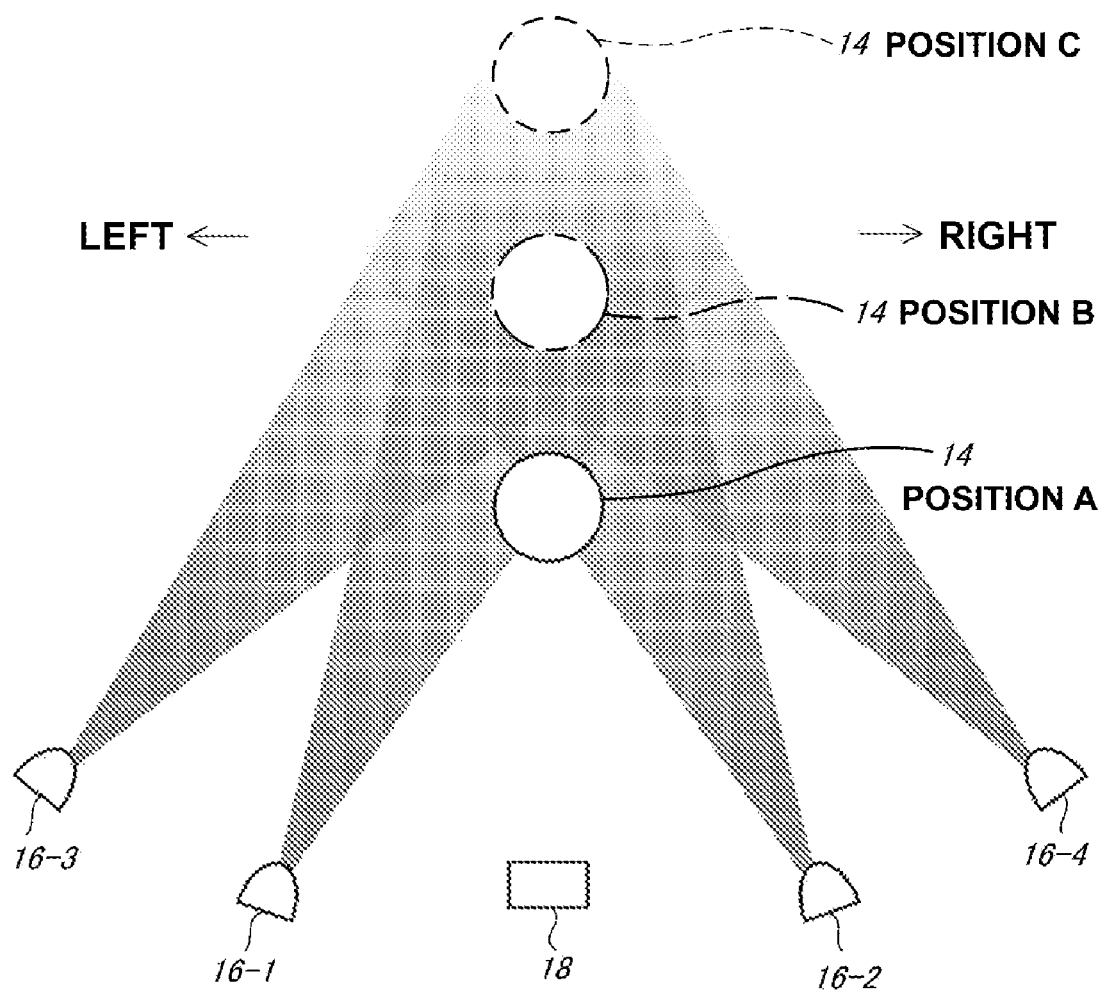
FIG. 12 is an explicative diagram showing a first exemplary modification of a position judgment apparatus made in accordance with principles of the disclosed subject matter.

Another method, for example, can serially compare a plurality of composite image data as shown in FIG. 12 and can also carry out the position judgment regarding whether an object 14 is traveling towards the position judgment apparatus 30, or traveling away from it in accordance with the comparing result. Thus, even if both the position judgment apparatus 30 and an object 14 move in relation to a vehicle or the like, the position judgment apparatus 30 can judge a relative location with respect to an object 14.

When the light sources 16-1, 16-2 in the position judgment apparatus 30 have different respective wavelengths, a position of an object 14 as measured by the light L3 and as measured by the light L4 can be surely recognized. Thus, each different wavelength of the light sources 16-1, 16-2 can result in providing the position judgment apparatus 30 an ability to judge with high accuracy.

In the above described exemplary embodiments, two light sources 16-1, 16-2 emit light towards an object 14. However, the amount of light sources is not limited to two and can include more light sources. An increase of the light source amount can result in improving a judging accuracy of the position judgment apparatuses 10, 30. For example, the position judgment apparatuses 10, 30 can include an additional light source 16-3 adjacent the light source 16-1 and a light source 16-4 adjacent the light source 16-2 as shown in FIG. 12.

In the position judgment apparatuses 10, 30 that includes four light sources, an object 14 located at position A nearest the photo-detector 18 can be illuminated by light sources 16-1, 16-2. An object 14 located at positions B, C is farther from the photo-detector 18 than when at position A. When located at positions B and C all four light sources can illuminate the object 14, and the increase of the amount of light enables the position judgment apparatuses 10, 30 to judge a location (and whether the location is nearer or further with respect to time) of an object 14 with a high accuracy using a differential brightness.

Figure 14:
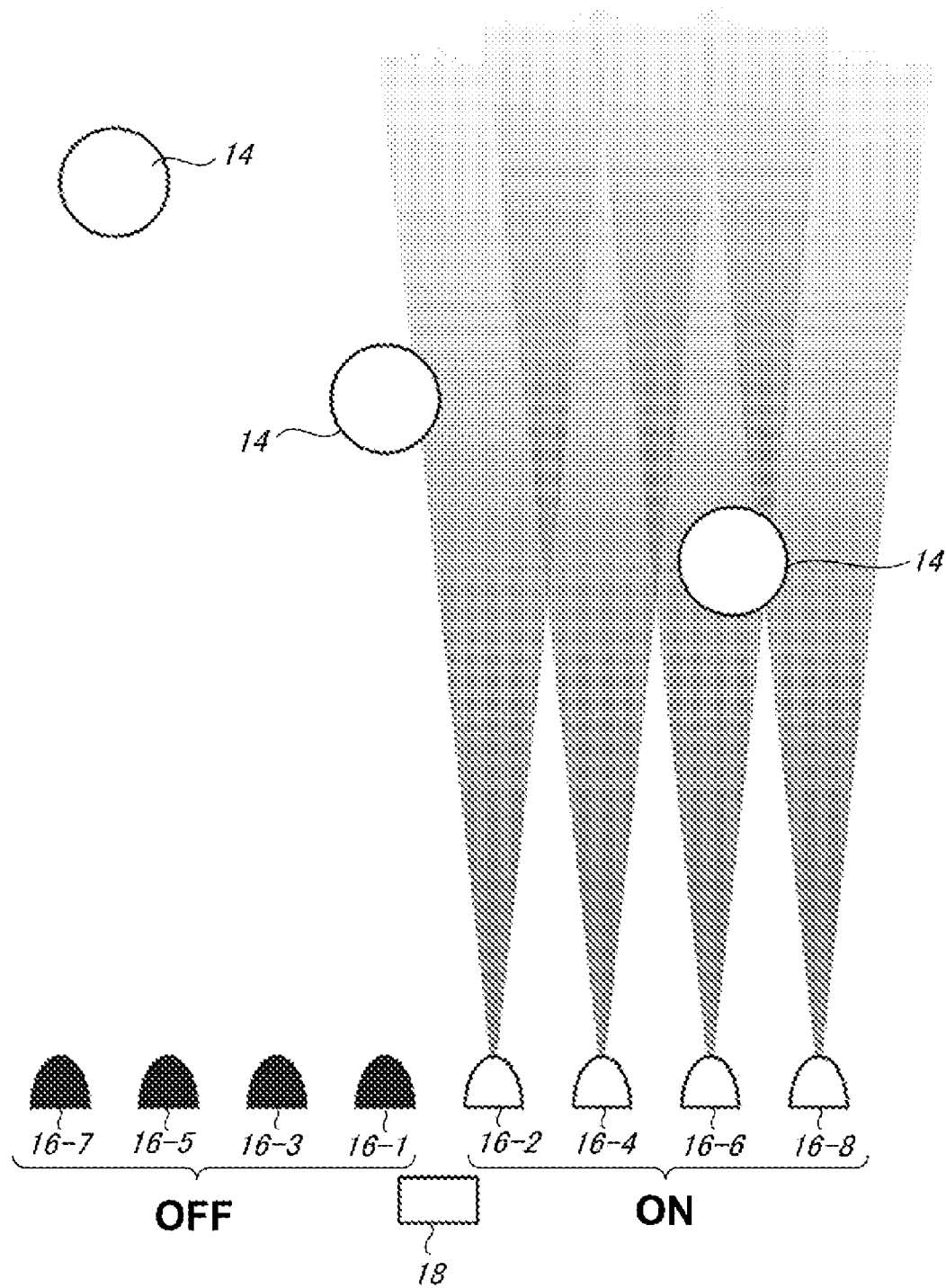
FIG. 14 is an explicative diagram showing a third exemplary modification of a position judgment apparatus made in accordance with principles of the disclosed subject matter.
Figure 15:
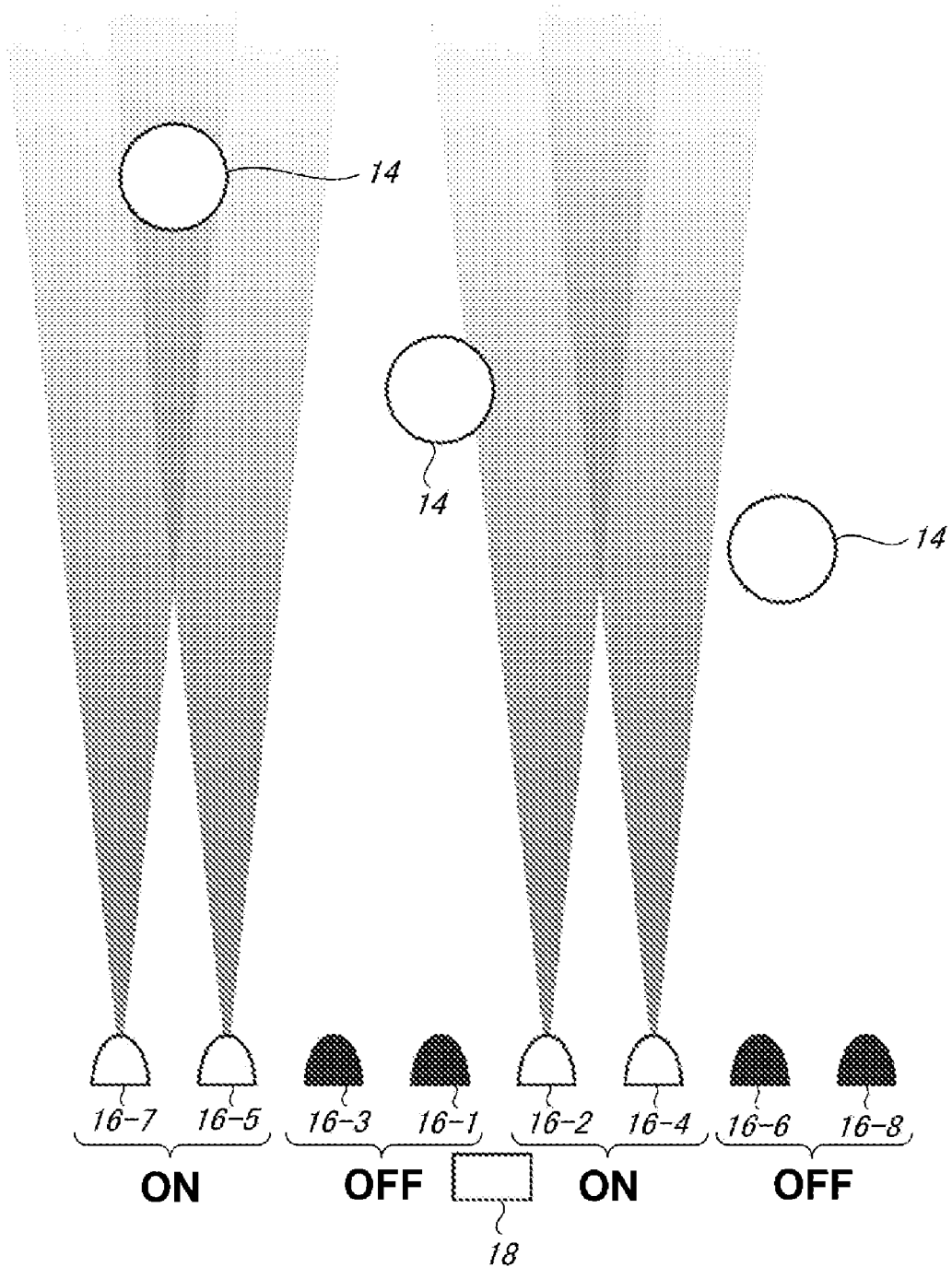
FIG. 15 is an explicative diagram showing a fourth exemplary modification of a position judgment apparatus made in accordance with the disclosed subject matter.
Figure 16:
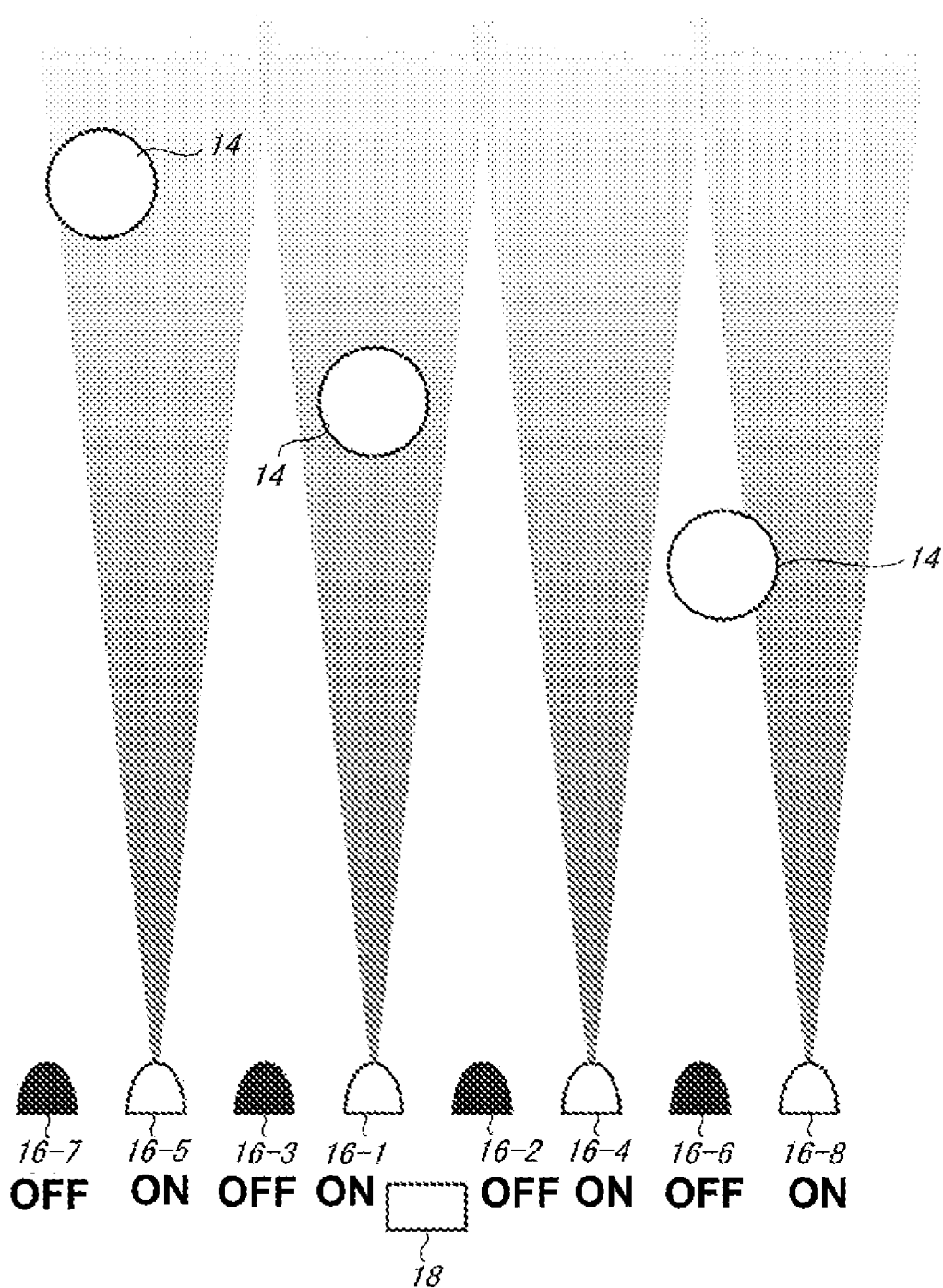
FIG. 16 is an explicative diagram showing a fifth exemplary modification of a position judgment apparatus made in accordance with principles of the disclosed subject matter.
Figure 17:
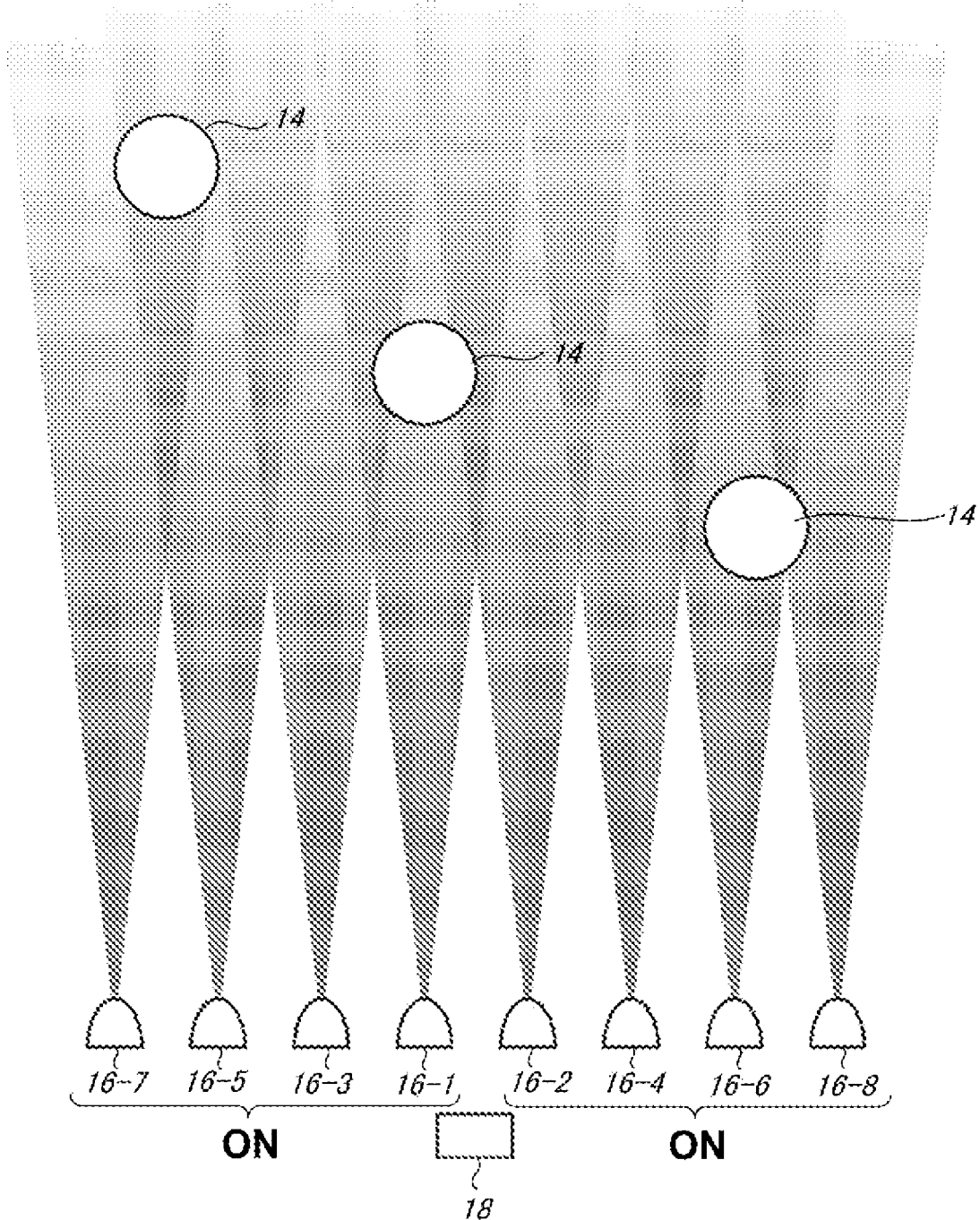
FIG. 17 is an explicative diagram showing a sixth exemplary modification of a position judgment apparatus made in accordance with principles of the disclosed subject matter.

Furthermore, eight light sources 16-1-16-8 can be located in a line as shown in FIG. 14. In the position judgment apparatuses 10, 30 providing such a number of light sources (eight light sources 16-1-16-8), a light-emitting waveform can be formed so that each of the light sources emits towards the object 14 in turn. However, a light-emitting waveform in which a plurality of the light source are turned on and off using a voluntary combination can also be formed as shown by FIGS. 14-17. For example, because the position judgment apparatuses 10, 30 can simultaneously judge relative location of a plurality of objects 14 shown in FIGS. 15-16, they can decrease a process time as compared to the case in which each of the light sources emit in turn, and can they also spread a judging area of the objects 14. FIG. 18 shows a state in which the eight light sources 16-1-16-8 all emit light. In this case, for example, the first light-emitting waveform can be employed.

In the above described exemplary embodiments, the disclosed subject matter is described regarding an object such as a spherical shape, however, the disclosed subject matter is not limited to a spherical object 14. The position judgment apparatuses 10, 30 of the disclosed subject matter can judge an object 14 with many various and arbitrary shape or shapes and can also judge a number of objects 14 substantially without limitation.

In the position judgment apparatus 30 of the above described second exemplary embodiment, a location of an object 14 (whether the object is approaching or retreating) can be judged by evaluating an area, a position and a brightness of an object 14 in a composite image data with respect to each cycle. However, the position judgment apparatus 30 may judge a relative location of an object 14 by evaluating one or two of an area, a position, and a brightness thereof in each composite image data of cycles.

While there has been described what are at present considered to be exemplary embodiments of the disclosed subject matter, it will be understood that various modifications may be made thereto, and it is intended that the appended claims cover such modifications as fall within the true spirit and scope of the invention. All conventional art references described above are herein incorporated in their entirety by reference.

What is claimed is:

1. A method for position judgment, comprising:
    emitting from a first light source, a first pulsed light that alternates turning on and turning off at a predetermined interval/phase, towards an object from a first position;
    emitting from a second light source, a second pulsed light having a different interval/phase from the predetermined interval/phase of the first pulsed light, towards the object from a second position different from the first position;
    detecting reflected light pulses in series from the first pulsed light and the second pulsed light that are reflected from the object;
    calculating an absolute value of a difference between brightness of each of the reflected light pulses, wherein the absolute value of the differential brightness substantially eliminates a brightness of a background of the object and is substantially calculated by using the reflected light pulses reflected from the object by the first pulsed light and the second pulsed light;
    comparing the absolute value of a first of the reflected light pulses with the absolute value of a second of the reflected light pulses; and
    judging whether the object is approaching or not, in accordance with the comparing the absolute value of a first of the reflected light pulses with the absolute value of a second of the reflected light pulses.

2. The method for position judgment according to claim 1, wherein each of the first pulsed light and the second pulsed light alternates turning on and turning off with each other.

3. The method for position judgment according to claim 2, wherein each of the reflected light pulses of both the first pulsed light and the second pulsed light is detected when a corresponding light of the first and second pulsed lights is emitted, respectively.

4. The method for position judgment according to claim 2, wherein both the first pulsed light and the second pulsed light are emitted by at least one LED, respectively.

5. The method for position judgment according to claim 1, wherein each of the first pulsed light and the second pulsed light are turned on simultaneously, respectively.

6. The method for position judgment according to claim 5, wherein each of the reflected light pulses of both the first pulsed light and the second pulsed light is detected when a corresponding light of the first and second pulsed lights is emitted, respectively.

7. The method for position judgment according to claim 5, wherein both the first pulsed light and the second pulsed light are emitted by at least one LED, respectively.

8. The method for position judgment according to claim 1, wherein both the first pulsed light and the second pulsed light are emitted by at least one LED, respectively.

9. A method for position judgment, comprising:
    emitting from a first light source, a first pulsed light that alternates turning on and turning off at a predetermined interval/phase, towards an object from a first position;
    emitting from a second light source, a second pulsed light having a different interval/phase from the predetermined interval/phase of the first pulsed light, towards the object from a second position different from the first position;
    detecting reflected light in series, of which one is respectively the first pulsed light and one is the second pulsed light each reflected from the object at different times;
    forming composite image data that is composed of each reflected light reflected from the object by the first pulsed light and the second pulsed light at each different time;
    calculating at least one of a position, an area and a brightness of the object from the composite image data;

comparing at least one of the position, the area and the brightness with a corresponding previous one of the position, area and brightness; and judging whether the object is approaching or not, in accordance with the comparing at least one of the position, the area and the brightness with a corresponding previous one of the position, area and brightness.

10. The method for position judgment according to claim 9, wherein each of the first pulsed light and the second pulsed light alternates turning on and turning off with each other.

11. The method for position judgment according to claim 10, wherein each of the reflected light pulses of both the first pulsed light and the second pulsed light is detected when a corresponding light of the first and second pulsed lights is emitted, respectively.

12. The method for position judgment according to claim 10, wherein both the first pulsed light and the second pulsed light are emitted by at least one LED, respectively.

13. The method for position judgment according to claim 9, wherein each of the first pulsed light and the second pulsed light are turned on simultaneously, respectively.

14. The method for position judgment according to claim 13, wherein each of the reflected light of both the first pulsed light and the second pulsed light is detected when a corresponding light of the first and second pulsed lights is emitted, respectively.

15. The method for position judgment according to claim 9, wherein both the first pulsed light and the second pulsed light are emitted by at least one LED, respectively.

* * * * *